J. O. MORRIS.
METHOD OF STEMMING TOBACCO LEAVES.
APPLICATION FILED JUNE 20, 1908.
961,746.
Patented June 14, 1910.
3 SHEETS—SHEET 2.
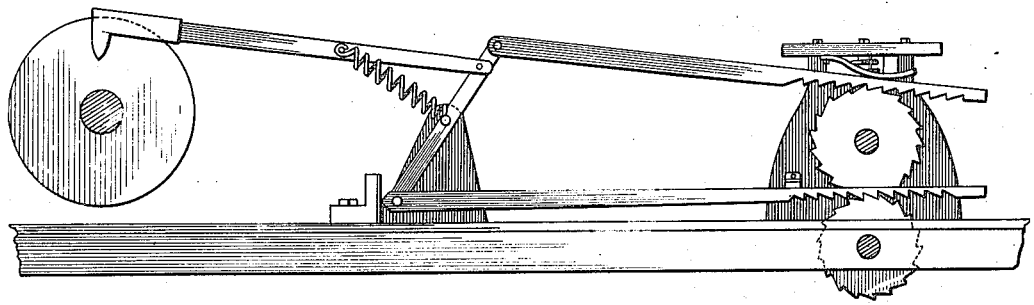
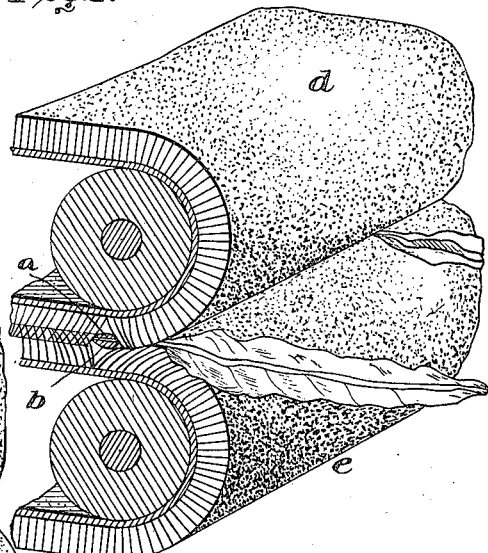
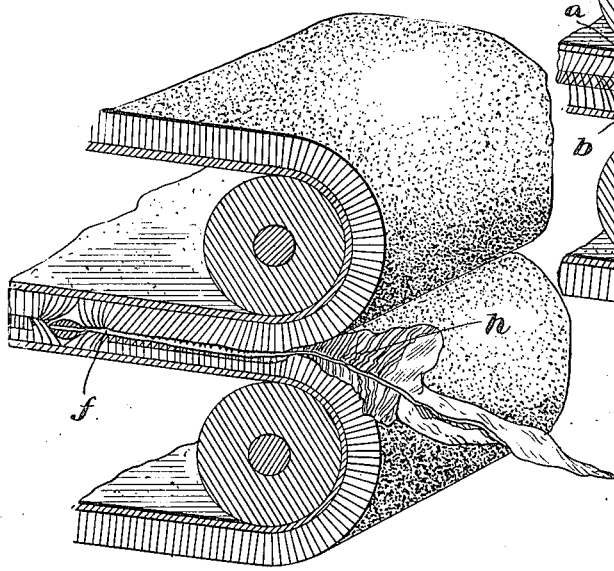
Inventor
John O. Morris,
Witnesses
C. P. Wright, Jr.
A. W. Ehrling
By A. S. Pattison
Attorney

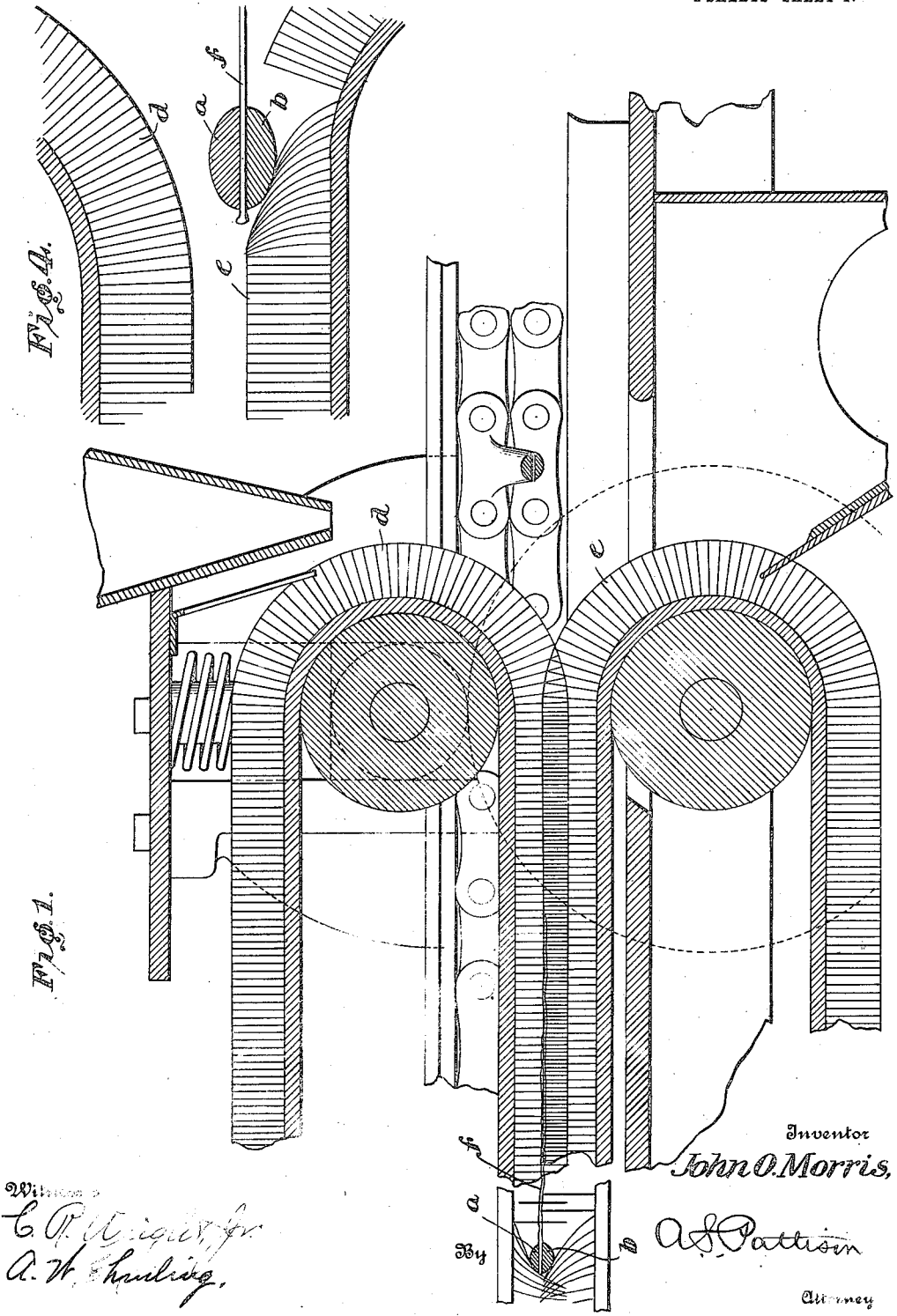

UNITED STATES PATENT OFFICE.

JOHN O. MORRIS, OF WASHINGTON, DISTRICT OF COLUMBIA, ASSIGNOR, BY MESNE ASSIGNMENTS, TO NATIONAL TOBACCO STEMMING MACHINE COMPANY, OF BALTIMORE, MARYLAND, A CORPORATION OF DELAWARE.

METHOD OF STEMMING TOBACCO-LEAVES.

961,746.       Specification of Letters Patent.    Patented June 14, 1910.

Original application filed November 5, 1907, Serial No. 400,873. Divided and this application filed June 20, 1908. Serial No. 439,554.

*To all whom it may concern:*

Be it known that I, JOHN O. MORRIS, a citizen of the United States, residing at Washington, in the District of Columbia, have invented certain new and useful Improvements in the Method of Stemming Tobacco-Leaves, of which the following is a specification, reference being had therein to the accompanying drawing.

This invention relates to improvements in the method of stemming tobacco leaves, and this application is a division of my application Serial No. 400,873, filed November 5th, 1907.

The present method of stripping the blades of tobacco leaves from the stems consists primarily in subjecting the leaves to a pulling action longitudinal the stem, butt-end foremost, in a direction transverse and against a plurality of closely-arranged substantially-stationary stripping teeth, whereby the blade portions are effectively and expeditiously removed from the stem without material injury.

The following views taken from my said application are sufficient to enable my method to be understood, in which—

Figure 1, is a sectional view showing the receiving end of the strippers, and the means for holding the leaves during the stripping operation. Fig. 2, is a perspective view showing the leaves at the beginning of the stripping operation. Fig. 3, is a similar view showing a leaf partially stripped. Fig. 4, is a view showing the strippers in position for the entrance of the leaves.

In practicing my improved method of stripping the leaves, the butt-ends of stems *f* of the leaves are grasped by suitable holders *a b*, as shown, and the stripping devices *d* and *e* are separated, as shown in Fig. 4, to receive the butt-end of the leaf stem. The strippers which consist of a plurality of closely-arranged teeth (preferably yielding) are then brought together which subjects the leaf to a transverse movement or action of the stripping teeth, which arrange themselves as shown in Fig. 2. The leaves are then subjected to a pulling action in a direction longitudinal the leaf stem, and against the stripping teeth while the latter are substantially held stationary, or substantially against any movement approaching or transverse the pulling or stripping path. This stripping or pulling movement is accomplished by a relative movement of the leaf and stripping teeth in a plane longitudinal the leaf stem, and this is accomplished by moving either the strippers, or the holders in said plane.

I have discovered that by subjecting the leaves to the foregoing action, the blade portions are stripped from the stem and doubled up in front of the strippers substantially as shown at *h*, Fig. 3, and without any substantial injury to the blade portions, and the stripped portions can then be removed in any desired manner.

Where "stationary" stripping teeth are referred to herein, it is meant that the teeth do not have any material rotary stripping action.

Having thus described my invention, what I claim and desire to secure by Letters Patent, is:—

The herein described method of stemming tobacco leaves, which consists in subjecting the leaves to a stripping movement in a stripping plane longitudinally of the leaf stem, and butt end foremost, against a plurality of closely arranged flexible teeth, and preventing any stripping action transversely across the stripping plane, during the stripping movement.

In testimony whereof I affix my signature in presence of two witnesses.

JOHN O. MORRIS.

Witnesses:
     C. R. WRIGHT, Jr.,
     JOHN L. FLETCHER.